8283X
H. Strait,
Steam Balanced Valve.
Patented June 25, 1834
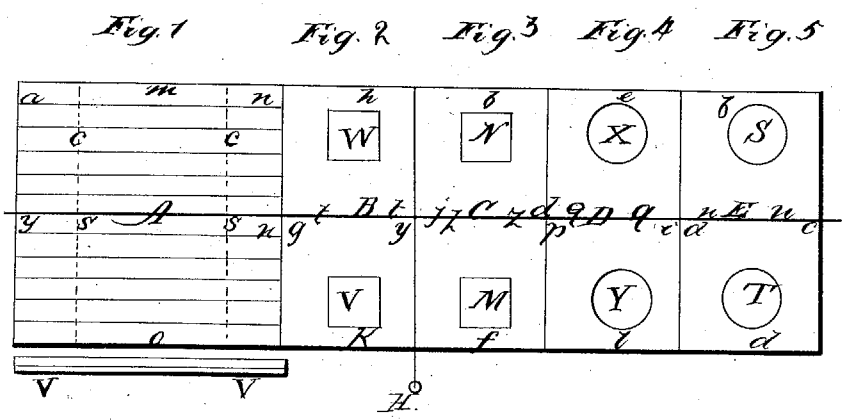
N. PETERS, PHOTO-LITHOGRAPHER, WASHINGTON, D. C.

Hiram Strait of East Nassau New York

Letters Patent.

The Schedule referred to in these Letters Patent and making part of the same, containing a description in the words of the said Hiram Strait himself of his improvement in the construction, application and operation of valves on the principle of a Balance.

To all to whom these presents shall come. Be it known that I Hiram Strait of East Nassau, in the County of Rensselaer and State of New York have invented a new and useful improvement in the construction, application and operation of valves on the principle of a Balance for the purpose of percussing, compressing and exhausting air and Water, and that the following is a full and exact description of the construction application and operation of valves on the said principle of a Balance as invented by me A represents the model to illustrate the construction application and operation of valves on the principle of a Balance, to create a powerful percussion on air. m, n, o, r, represents its sides which are four, of equal length and strongly joined together at their corners. s.s. represents its balancing centre or axle, which is strongly connected to the middle of the sides, r, n. Those small hair lines drawn from r. to n. parallel to the axle. s.s. represent small wires woven through their sides. v.v. represent a thin narrow stiff slip of light cloth paper or metal a little wider than to fill one interstice between those wires, and as long as m. or. o. This slip v.v. is to be nearly balanced & moveably hung across the wire w. w. the heaviest side or widest is to hang down and be restrained so as to open at any angle by means of the strings c.c. which are attached to the side m. Slips are to be similarly hung on all the small parallel wires and restrained by strings c. c. c. c. When this is done the handle H which is the common handle to operate the different modifications of the same principle in the model is to be moved quickly up and down which will cause a constant and powerful percussion on the air, and consequently reaction which will either propel or elevate as it is hung horizontally or perpendicularly. The slips may likewise be hung by one of their long sides and not balanced, though similarly restrained. When the handle H is raised all the valves between m. and s. s. close air tight and strike the air while those between o and s. s open and let the incumbent air through; when brought down, those that closed open and those that opened close so that it will strike the same one way as the other. The size weight and shape of the wings to create percussion hung on this principle of a balance are variable, but the principle of operation the same. The use for which I claim this valvular illustration of the

[illegible]

principle of a Balance as an Inventor are its application to the theory and practice of aerial
marine, and sub-marine navigation to the propulsion of cars on Rail Roads, Canal Boats
Wind Mills, and Ventilators. B Fig 2nd represents the model to illustrate the construction
application and operation of Valves on the principle of a balance for the purpose of condens-
ing or compressing and blowing air. h. y. k. g. represent a strong plank which is
balanced and moveably hung to the bottom of an air tight air cistern. The cistern
can be of any shape and size. but its bottom must come to a point or ridge or resemble
an inverted roof. Across this ridge this plank is balanced so that its sides h and k will
alternately strike on each side of the ridge. or the bottom may be flat and then this plank
must be curved or bent at its centre so as to allow the balancing motion. t. t. represent
its axle or the middle where it is balanced across the bottom of the cistern
V. W. represent two valves of a sufficient size one on each side of the balancing point
which are to open upward as far as necessary for the easy admission of air. Valves being
made and hung in the bottom of the air cistern, directly over having the balancing plank. and
double their dimensions so as to open sufficiently inwards. The Bottom of the cistern on
each side the ridge is to be air tightly fastened by leather to this balancing plank, so
as to allow its motion. and then when the double Handle H is either raised or depressed
it will throw as much air into the air cistern by an upward as downward motion.
When the handle H is raised the valve W in the plank opens and lets in air. while
the valve V closes tight and forces the air between it and the cistern through its own
valve into it while when brought down. the valve V opens to let in air. and the valve
W forces air into the cistern. The top of the air cistern can be made by means of
leather to settle or fall as far into the cistern as it raises above and thus keep up the
blast when the motion has ceased for some time. according to the dimensions of the
cistern. The uses for which I claim this valvular illustration of the principle of a
Balance as inventor. are its application to blowing and the condensation or compression of
air. either for the purposes of a moving power or explosion.
C fig 3d represents a model to illustrate the construction application and operation of
valves on the principle of a Balance. for the purpose of exhausting or pumping air from
air tight reservoirs of any shape or size. The construction application and operation are
the same as those described in Figure 2nd. only that the valves instead of opening in-
ward must open outward. b. d. f. g. represent the balancing plank. z. z. its axle or
balancing point. and M. N. its valves which are hung directly under those in the

8283 X bottom of the reservoir to be exhausted of air. The uses for which I claim this valvular illustration of the Principle of a Balance as an Inventor are its application to the exhausting of air from all kinds of Reservoirs either for practical or scientific purposes.

D. Figure 4th represents the model to illustrate the construction application and operation of valves on the principle of a Balance for the purpose of pumping raising and compressing water {i e l p} represent the sweep to which the two piston Rods are attached on the lower ends of which the valves are hung either on a Balance or laterally. g g. represent the balancing point or centre of the sweep. XY represent the upper orifices of two hollow tubes or pipes whose lower extremities are inserted into a body of water. When the handle H is raised the piston that operates in the orifice Y. will raise the water over its valve. as that will immediately close while that in X opens to let the water up and thus whether the handle H is raised or depressed it will raise or pump as much water at an upward or downward motion. Any number of valves may be balanced and operate on this principle with ease and facility. The uses for which I claim this valvular illustration on the principle of a Balance as an inventor. are its application to raising pumping and compressing water for all practical purposes either for ships, wells, vessels, Boats, Steam Engines. fountains. and to the motion of Machinery propelled by water.

E. figure 5th represents the model to illustrate the construction, application and operation of valves on the principle of a Balance, so as to create a powerful pressure either by water or air. a.b.c.d. represent or the balance lever. n.n. its pivot or axle across which it is balanced. S.T. represent valves through which. the air or water is to pass in order to create the pressure. The balancing valves are to be hung and have others hung on them. the same as in figure 2nd. The pressure will be communicated both by the upward & downward motion of the handle H. and can be either uniform or intermittent.

The uses for which I claim this valvular illustration of the principles of a Balance as an Inventor are. its application to printing stamping raising weights & the communication of all kinds of impressions. These five illustrations of the construction application & operation of valves on the principles of a balance can be operated by any moving power Exd
M.H.

Witnesses
Jno G. Dusenbury
Geo. McStrait

Hiram Strait

Drawing 1564 words